Dec. 1, 1936.  E. B. BERKOWITZ  2,062,776
ENVELOPE
Filed Aug. 13, 1934  3 Sheets-Sheet 1
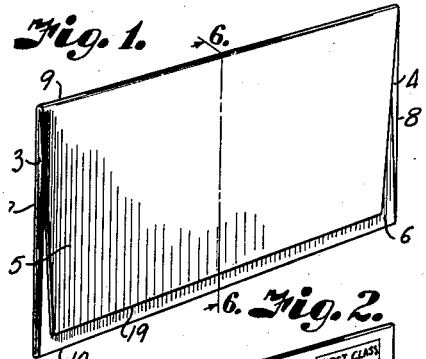
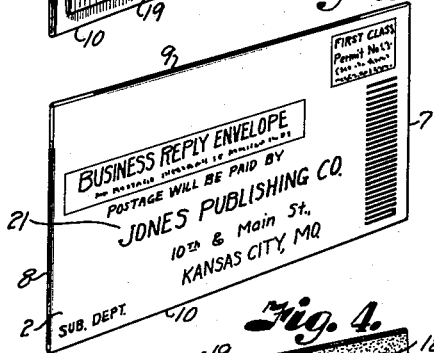
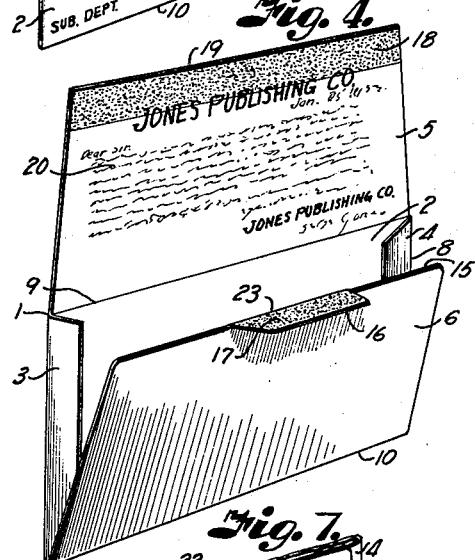
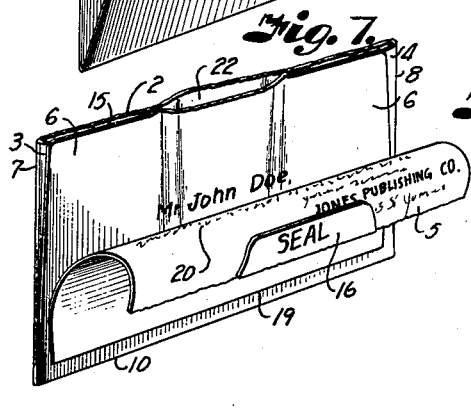
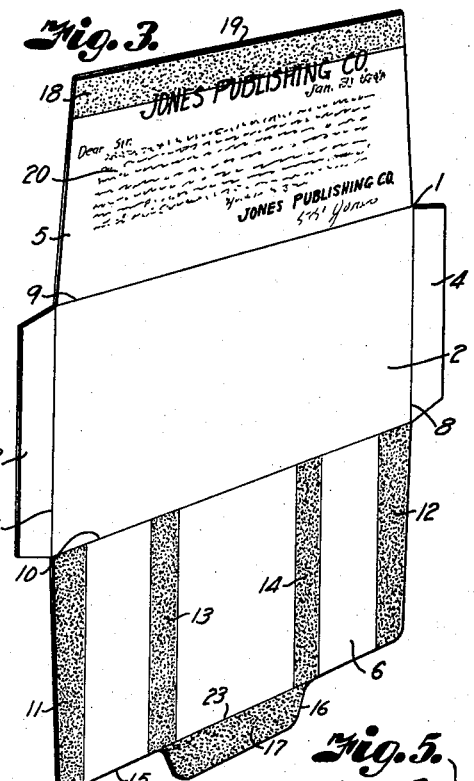
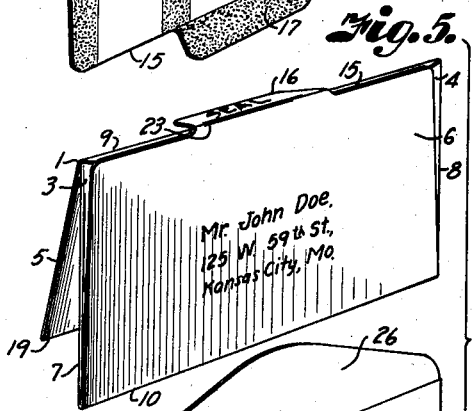
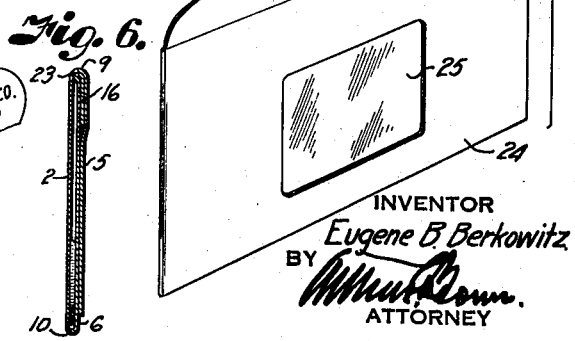
INVENTOR
Eugene B Berkowitz
BY
ATTORNEY Dec. 1, 1936.  E. B. BERKOWITZ  2,062,776
ENVELOPE
Filed Aug. 13, 1934  3 Sheets-Sheet 2
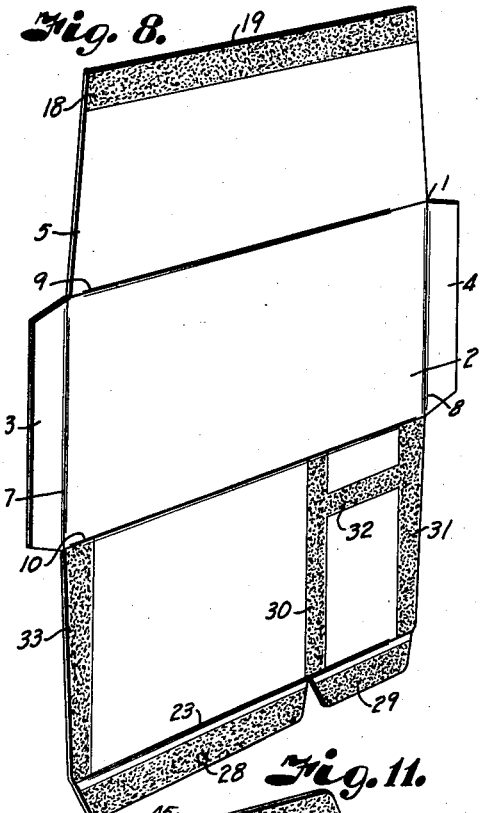
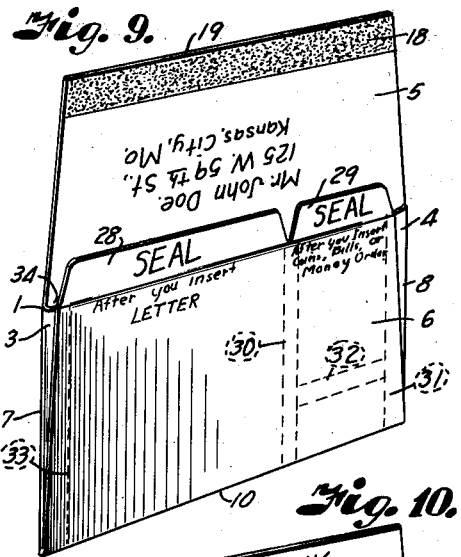
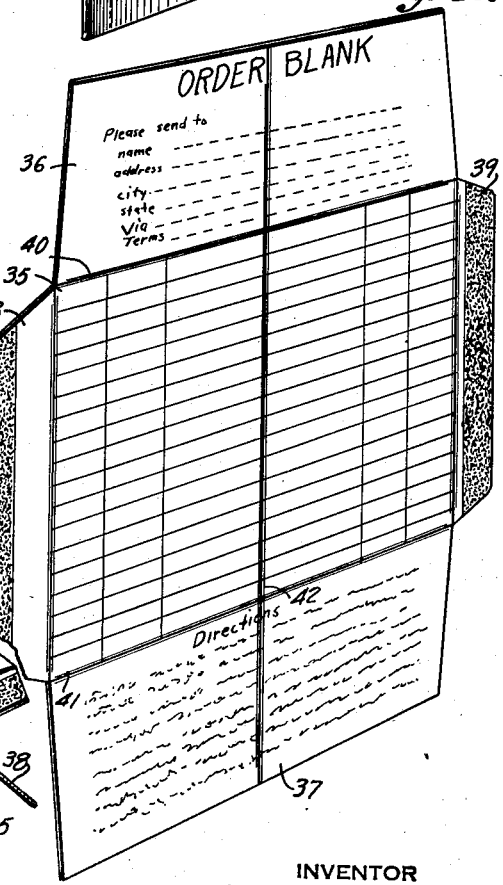
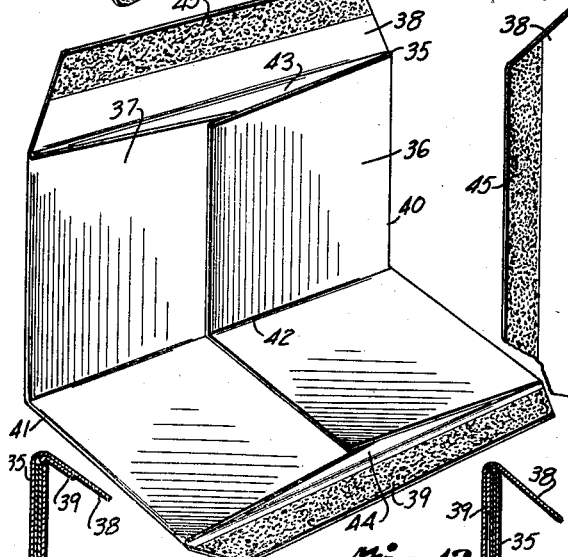
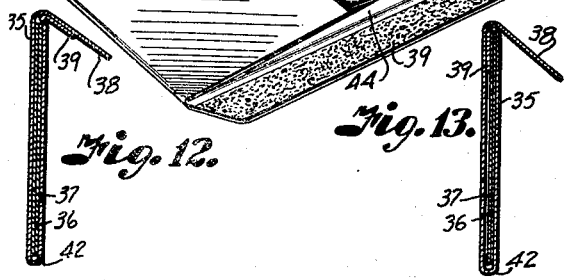
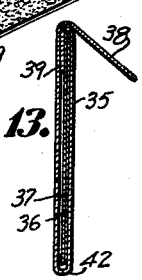
INVENTOR
Eugene B. Berkowitz.
BY
ATTORNEY.

Dec. 1, 1936.　　　E. B. BERKOWITZ　　　2,062,776
ENVELOPE
Filed Aug. 13, 1934　　　3 Sheets-Sheet 3
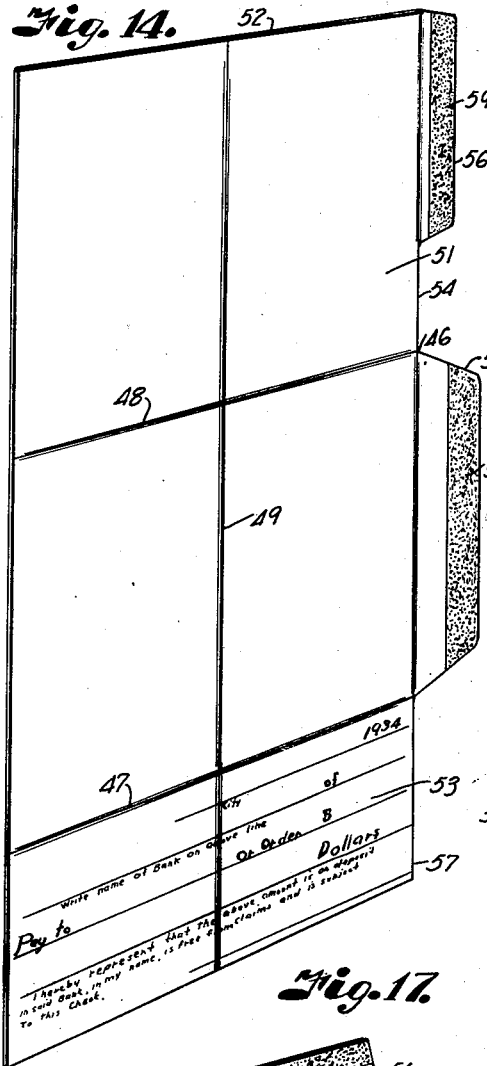
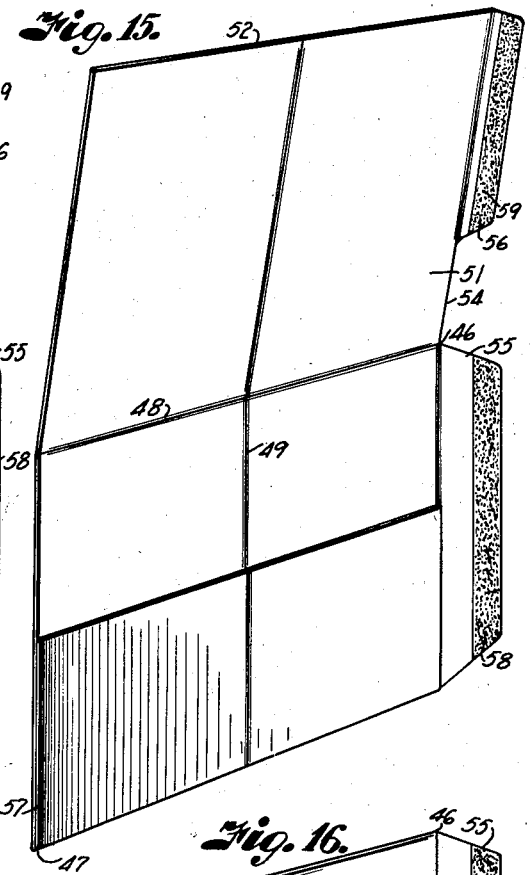
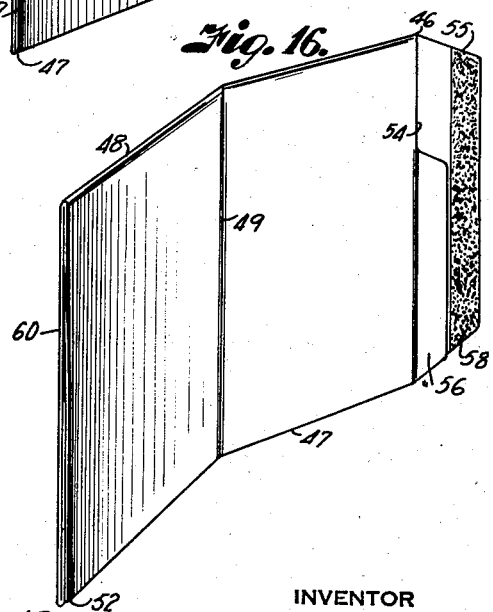
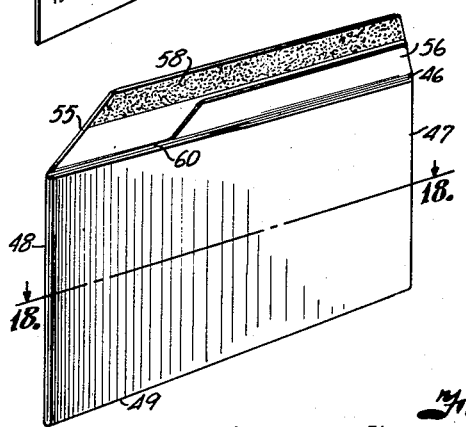
INVENTOR
Eugene B. Berkowitz
BY
ATTORNEY Patented Dec. 1, 1936

2,062,776

UNITED STATES PATENT OFFICE 2,062,776

ENVELOPE

Eugene B. Berkowitz, Kansas City, Mo., assignor to Berkowitz Envelope Company, Kansas City, Mo., a corporation of Delaware Application August 13, 1934, Serial No. 739,598

13 Claims. (Cl. 229—80)

This invention relates to envelopes and more particularly to those of that character for containing coins, currency and the like, and has for its principal object to provide an envelope of this character which may serve the purposes of a coin card, a return envelope and a solicitation letter.

Other important objects of the invention are to provide an envelope of this character having simple and inexpensive construction, which is capable of easy manipulation and wherein coins or currency are safely contained without danger of loss.

Still further objects of the invention are to provide for positive identification of the sender of the coins contained in the envelope and to provide for simultaneously opening the coin compartment upon opening of the sealing flap of the envelope.

In accomplishing these and other objects of the invention, I have provided improved details of structure, the preferred form of which is illustrated in the accompanying drawings, wherein:

Fig. 1 is a perspective view of the sealing flap side of a coin envelope embodying the features of the present invention.

Fig. 2 is a perspective view of the address side of the envelope.

Fig. 3 is a detail perspective view of the blank from which the envelope is formed.

Fig. 4 is a perspective view of the envelope blank in partly folded position particularly illustrating the coin compartment and sealing flaps.

Fig. 5 is a perspective view of the coin envelope as it is inserted in a window envelope for mailing to an addressee.

Fig. 6 is a cross sectional view through the coin envelope after it has been sealed to retain a coin.

Fig. 7 is a perspective view of the coin envelope after it has been opened to remove the coins and to expose the name and address of the addressee or sender.

Fig. 8 is a perspective view of a modified form of blank which forms a double pocket when folded.

Fig. 9 is a perspective view of the envelope formed from the blank shown in Fig. 8.

Fig. 10 is a perspective view of a still further modified form of blank.

Fig. 11 is a perspective view of the blank shown in Fig. 10 after it has been folded.

Fig. 12 is a section through a portion of the folded blank illustrating the seal of the back flap to the front flap.

Fig. 13 is a similar view showing the back sealing flap tucked between the side folds and the front flap.

Fig. 14 is a perspective view of a further modified form of blank.

Fig. 15 illustrates the first step in folding the blank shown in Fig. 14.

Fig. 16 illustrates the second step of folding the blank.

Fig. 17 illustrates the third step of folding the blank which completes the envelope with the exception of sealing the sealing flaps.

Fig. 18 is a cross-section on the line 18—18, Fig. 17.

Referring more in detail to the drawings:

1 designates an envelope blank including a front portion 2 of substantially rectangular shape having end sealing flaps 3 and 4, a top sealing flap 5 and a back flap 6, all of which are formed integrally with the front portion 2 and are adapted to be folded on score lines 7, 8, 9 and 10 defining the boundaries of the front portion 2.

The back flap 6 is substantially the same width and depth as the front portion 2 and carries stripes of gum 11 and 12 at the ends thereof and intermediate stripes of gum 13 and 14 extending across the back flap from the score line 10 to its opposite edge 15. However, if desired, the stripes of gum 13 and 14 may terminate short of the line 10 and be connected with a stripe of gum as shown in Fig. 8.

Formed on the edge 15 of the back flap and extending between the intermediate gum stripes 13 and 14 is a sealing flap 16 having gum 17 on its inner face. The sealing flap 5 is preferably of shorter depth than the front portion 2 of the envelope and carries a sealing gum 18 on its inner face and extending along the outer edge 19 thereof, as clearly illustrated in Fig. 3. The rear face of the sealing flap may be printed with a solicitation letter requesting business, for example, magazine subscriptions, as indicated at 20, while on the front face of the portion 2 of the blank may be printed the address of the solicitor, together with the usual insignia to designate a business reply envelope, as indicated at 21, Fig. 2.

In folding the envelope blank, the end flaps 3 and 4 are folded on the score lines 7 and 8 to lie flat against the inner face of the front portions 2 of the blank. The back flap 6 is then folded on the score line 10 so that the sealing stripes 11 and 12 are sealed against the end flaps 3 and 4 to form an envelope pocket.

Simultaneously with sealing of the end flaps, the stripes of gum 13 and 14 are sealed against the inner face of the body portion 2 to provide a coin pocket 22 intermediate the ends of the envelope, the bottom of which is defined by the score line 10 in the case of the blank shown in Fig. 3 or by the connecting stripe of gum in case of the blank shown in Fig. 8, and the sides of the pocket are formed by the inner edges of the gum stripes 13 and 14.

The sealing flap 16, however, is left unattached to provide an opening for the insertion of coins, currency or the like into the pocket, as later described.

The sealing flap 5 is then folded on its score line 9 so that it lies flat against the front face of the body portion 2 to expose the solicitation letter 20. The sealing flap 16 is then folded on the line 23 at its juncture with the edge 15 of the back flap to overlap the inner or that face of the sealing flap carrying the solicitation letter, as shown in Fig. 5. The addressee's name and address may be applied to the back flap directly over the coin pocket, i. e., on the outer face of the back flap in the area between the gum stripes 13 and 14. In sending the coin envelope to the addressee, it may be enclosed in an envelope 24 having a transparent window opening 25 to expose the name of the addressee, after which the flap 26 on the closing envelope is sealed and ready for mailing.

When the addressee receives the envelope, the sealing flap 26 is opened to withdraw the coin envelope exposing the solicitation letter. He reads the request for the magazine or other solicitation and inserts the proper number of coins, currency, check, money order, or the like, in the coin pocket to cover the cost of the subscription. He then moistens and seals the coin flap 16 against the inner face of the sealing flap to retain the coins in the pocket. He next moistens the gum on the sealing flap 5 and folds it over the outer face of the back flap, covering his name and address which are printed over the coin pocket, the gum sealingly engaging the envelope below the place of address, as shown in Fig. 7. The addressee then returns the envelope to the sender as a conventional letter.

When the envelope is received, it is opened by inserting a letter opener between the sealing flap and the back flap to cut along the score line 9. Since the sealing flap for the coin pocket is sealed against the inner face of the back flap, the letter opener will simultaneously sever the sealing flap from the coin pocket to allow removal of the coins. When the sealing flap is turned back, as shown in Fig. 7, the name and place of residence of the original addressee is exposed to show the person sending the coin, so that there can be no danger of mishandling the application and the subscription, or miscrediting of the remittance.

The form of blank shown in Fig. 8 is substantially the same as that shown in Fig. 3 with the exception that the back flap has two sealing flaps 28 and 29 and the portion of the back flap therebetween is provided with a single gum stripe 30 which may be connected to the end gum stripe 31 by a gum stripe 32. When the back flap is folded against the front flap and the gum stripes 30, 31 and 32 and the other end gum stripe 33 are sealed, two pockets are formed; one pocket 34 may be used for enclosing letters and the other pocket for enclosing coins, currency and the like. In the construction shown, the bottom of the coin pocket is formed by the gum stripe 32. After a letter and coin are placed in the respective pockets, the flaps 28 and 29 thereon are sealed against the sealing flap 5 in the same manner as the sealing flap 16 in the form of the invention shown in Fig. 3.

In Fig. 11 is shown a still further modified form of the invention wherein the blank constitutes an order sheet having a substantially rectangular body 35 provided with side wings 36 and 37 and sealing flaps 38 and 39 on the respective sides thereof.

In folding the blank to form an envelope, the wings 36 and 37 are folded over the body portion on the lines 40 and 41, after which the body portion and wings are folded on a line 42 intermediate the sealing flaps 38 and 39 to form pockets 43 and 44. The pockets may safely contain a letter, currency, money order, check or the like when the flap 39 is sealed against the flap 38, the flap 38 being longer than the flap 39 to expose a stripe of gum 45 whereby the flap 38 can be sealed over the back of the pocket 43, as shown in Figs. 12 and 13.

If desired, the flap 39 may be tucked within the open end of the pocket 43 as shown in Fig. 13 instead of sealing it against the other flap, as shown in Fig. 12.

When the envelope shown in Figs. 10 to 12 is to be opened a letter opener may be inserted under the sealing flap 38 to also simultaneously sever the sealing flap 39 which closes the pockets so that the portion of the blank containing the order is not mutilated but opens out in sheet form.

From the foregoing it is apparent that I have provided a simple envelope construction which serves the purposes of a solicitation letter, a return envelope for an enclosure, and a coin card, and that the envelope may be readily manipulated to enclose coins or the like without possible chance of error.

It is also apparent that the envelope is most convenient to the firm soliciting the business for the reason that the pocket associated with the soliciting letter facilitates the ease with which the sender may comply with the solicitation request, thereby stimulating the solicitor's business.

The blank shown in Figs. 14 to 18, inclusive, includes a rectangular body portion 46 having transverse score or indicated fold lines 47 and 48 and a vertical line 49 located intermediate the width of the body portion. That portion 51 of the blank between the upper edge 52 and the line 47 may carry a printed order blank or the like and that portion below the line 47 may carry the printed form of a blank check as indicated at 53. One side edge 54 of the blank has sealing flaps 55 and 56, the sealing flap 55 extending between the lines 47 and 48 and the flap 56 from the upper edge 52 downwardly toward the flap 55 a distance substantially equal to the width of the check portion 57 of the blank. The flap 55 is of greater width than the flap 56 and the gum stripe 58 thereon is spaced from the body portion of the blank whereby the gum stripe 59 on the flap 56 may be sealed thereagainst without overlapping the gum stripe 58, as later described.

In using the blank, the letter or order is written upon the space provided, together with the name and address of the sender. The check is then filled out with the amount of the order or other payment to be included with the letter. If desired, a money order, currency, or other monetary medium may be placed over the check portion 57 which is then folded on the line 47, as shown in Fig. 15. The upper portion of the blank is then folded on the line 48, so that the upper edge 52 thereof overlies the check portion 57 in substantial alignment with the fold line 47, as shown in Fig. 16.

The gum stripe 59 on the flap 56 is then sealed to the flap 55, after which the blank is again folded, this time on the line 49, as shown in Fig. 17. The folds are then completed with the exception of sealing the flap 55 which is then folded over the edge 60 to complete the envelope. When the flaps are thus sealed, the monetary medium is safety contained within the envelope and cannot be detected owing to the several plies of paper stock with which it is interlapped incidental to the respective folds.

When the envelope is to be opened upon receipt by the addressee, a paper knife or similar instrument is run under the folds of the sealing flaps 55 and 56 to simultaneously sever both flaps similarly to the form of the invention above described. The blank can then be unfolded in the form of a flat rectangular sheet to expose the enclosure. If the receipt is made by means of the printed check form, the check is severed along the line 47 and cashed in the usual manner.

What I claim and desire to secure by Letters Patent is:

1. An envelope including a front member, a back flap sealingly folded over the front member to form a pocket of smaller size than the front member, a sealing flap on the front member foldable over the back flap, and a sealing flap on the back flap and adapted to be sealed to the sealing flap on the front member and foldable with said sealing flap to close the pocket.

2. An envelope including a front and a back member, means forming an open sided pocket on one of the members, a sealing flap on the front member extending along the open side of said pocket, and a sealing flap on the back member extending along the open side of said pocket adapted to be sealingly engaged with the first named sealing flap to close the pocket.

3. An envelope including a front member, a back flap sealingly folded over the front member, means forming an open sided pocket on the back flap of less size than the front member, a sealing flap on the front member foldable over the open side of the pocket, and a sealing flap extending along the open side of said pocket and adapted to be sealingly engaged with the first named sealing flap to close the pocket.

4. An envelope including a blank folded to form a front, a back flap and a sealing flap, the back flap having its ends sealed to the front and the sealing flap being adapted to be sealed to the back flap, means forming a pocket between the sealed ends of the back flap, and a supplemental sealing flap for the pocket for sealingly engaging the sealing flap.

5. An envelope including a blank folded to form front and back members, a sealing flap coextensive with the front member adapted to be sealed to the back member, means forming a pocket between the front and back members of less size than said members, and a supplemental sealing flap coextensive with the pocket for sealing engagement with the first-named sealing flap and adapted to underlie said sealing flap when said sealing flap is in sealed position.

6. An envelope including a blank folded to form a front, a back flap and a sealing flap, the back flap having its ends sealed to the front and the sealing flap being adapted to be sealed to the back flap, means forming a pocket between the sealed ends of the back flap, and a supplemental sealing flap for the pocket for sealing engagement with the sealing flap and adapted to underlie the sealing flap when the sealing flap is in sealed position.

7. An envelope including a front member, a back flap sealingly folded over the front member to form a pocket and having an area over the pocket on which the name and address of an addressee are printed, a sealing flap on the front member foldable over the back flap and sealable to the back flap to cover said area, and a sealing flap on the back flap for sealing engagement with the first named sealing flap to close the pocket.

8. An envelope including a front member, a back flap sealingly folded over the front member and secured to the front member to form a pocket and having an area over the pocket on which the name and address of an addressee are printed, a sealing flap foldable over the back flap and sealable to the back flap to cover said area, and a sealing flap on the back flap for sealing engagement with the first named sealing flap to close the pocket.

9. An envelope including a front member, a back flap sealingly folded over the front member and secured to the front member to form a pocket and having an area over the pocket on which the name and address of an addressee are printed, a sealing flap foldable over the back flap and sealable to the back flap at a point below said area to loosely cover said area, and a sealing flap on the back flap for sealing engagement with the first named sealing flap to close the pocket.

10. An envelope including front and back members, side flaps on one of the members and sealingly engaged with the other member, gum stripes on one of said members and spaced inwardly from the side flaps to sealingly engage against the other member to form a pocket intermediate the side flaps, a sealing flap coextensive with one of the members and foldable over the other to sealingly engage therewith, and a sealing flap coextensive with the pocket for sealing against the first named sealing flap and foldable with said first named sealing flap over said other member.

11. An envelope including front and back members, side flaps on one of the members sealingly engaging the other member, means for sealing said members together at a point spaced from one of the side flaps to form a pocket intermediate said side flaps, a sealing flap on one of the members adapted to be folded over and sealed to the other member, and a sealing flap for sealing against the first named sealing flap to close the pocket and foldable with said first named sealing flap over said other member.

12. An envelope including a sheet of foldable material forming a letter portion, covering portions foldable over the letter portion and thence transversely against each other to form front and back members of an envelope and to provide a pocket closed at the bottom and side edges by said folds, and sealing flaps of differential width projecting from opposite side edges of the sheet and arranged so that the narrow flap seals against the side of the other flap to close the pocket and so that the wider flap seals against the letter portion of the sheet.

13. An envelope including a sheet of foldable material forming a letter portion, covering portions foldable over the letter portion and thence transversely against each other to form front and back members of an envelope and to provide a pocket closed at the bottom and side edges by said folds, and sealing flaps of differential width projecting from a side edge of the sheet and arranged so that the narrow flap seals against the wider flap to close the pocket and so that the wider flap seals against the letter portion of the sheet.

EUGENE B. BERKOWITZ.